US006485367B1

(12) United States Patent
Joshi

(10) Patent No.: US 6,485,367 B1
(45) Date of Patent: Nov. 26, 2002

(54) SELF-LEARNING GAMING MACHINE

(75) Inventor: Shridhar P. Joshi, Skokie, IL (US)

(73) Assignee: WMS Gaming Inc., Waukegan, IL (US)

(*) Notice: Subject to any disclaimer, the term of this patent is extended or adjusted under 35 U.S.C. 154(b) by 0 days.

(21) Appl. No.: 09/917,040

(22) Filed: Jul. 27, 2001

(51) Int. Cl.[7] .......................... A63F 13/00; A63F 9/24

(52) U.S. Cl. .......................... 463/13; 463/20; 463/21; 463/23

(58) Field of Search .......................... 463/13, 20, 21, 463/23, 11

(56) References Cited

U.S. PATENT DOCUMENTS

| | | | | | |
|---|---|---|---|---|---|
| 4,657,247 | A | * | 4/1987 | Okada | 273/1 E |
| 4,679,789 | A | * | 7/1987 | Okada | 273/1 E |
| 5,542,669 | A | * | 8/1996 | Charron et al. | 463/13 |
| 5,833,538 | A | | 11/1998 | Weiss | 463/21 |
| 6,068,552 | A | | 5/2000 | Walker et al. | 463/21 |
| 6,106,395 | A | * | 8/2000 | Begis | 463/23 |
| 6,110,041 | A | | 8/2000 | Walker et al. | 463/20 |
| 6,238,288 | B1 | | 5/2001 | Walker | 463/26 |
| 6,254,483 | B1 | * | 7/2001 | Acres | 463/26 |
| 6,334,613 | B1 | * | 1/2002 | Yoseloff | 273/292 |
| 6,343,988 | B1 | * | 2/2002 | Walker et al. | 463/21 |

FOREIGN PATENT DOCUMENTS

| | | | |
|---|---|---|---|
| CA | 2272499 | 5/1999 | G06F/19/00 |

* cited by examiner

*Primary Examiner*—Denise L. Esquivel
*Assistant Examiner*—Marc Norman

(57) ABSTRACT

A self-learning gaming machine comprises a game of chance executed by a processor in response to a wager. The game includes a plurality of symbol-bearing indicia and an adjustable parameter. The adjustable parameter is adjusted by the processor for future plays of the game based on a player's selections affecting outcomes of at least one previous plays. During the previous play, the player's selection is made after the plurality of symbol-bearing indicia are displayed.

24 Claims, 14 Drawing Sheets

JACKS OR BETTER 91.71 % (DEFAULT)

| HANDS | OCCURRENCE | MIN PAYS | TOTAL | MAX PAYS | TOTAL | PROBABILITY | MAX EXPECTED VALUE |
|---|---|---|---|---|---|---|---|
| ROYAL FLUSH | 54.32 | 250 | 13579.57 | 20000 | 1086365.28 | 0.0000209 | 0.00836 |
| STRAIGHT FLUSH | 274.45 | 50 | 13722.51 | 2500 | 686125.44 | 0.0001056 | 0.00528 |
| FOUR OF A KIND | 6141.86 | 15 | 92127.93 | 750 | 4606396.70 | 0.0023632 | 0.035448 |
| FULL HOUSE | 29922.61 | 6 | 179535.64 | 300 | 8976781.85 | 0.0115133 | 0.0690798 |
| FLUSH | 29677.26 | 5 | 148386.32 | 250 | 7419316.09 | 0.0114189 | 0.0570945 |
| STRAIGHT | 29093.02 | 4 | 116372.07 | 200 | 5818603.63 | 0.0111941 | 0.0447764 |
| THREE OF A KIND | 193432.54 | 3 | 580297.61 | 150 | 29014880.40 | 0.0744269 | 0.2232807 |
| TWO PAIR | 335709.22 | 2 | 671418.45 | 100 | 33570922.26 | 0.1291706 | 0.2583412 |
| JACK OR BETTER | 559858.35 | 1 | 559858.35 | 50 | 27992917.35 | 0.2154163 | 0.2154163 |
| NO PAIRS | 1414796.37 | 0 | 0.00 | 0 | 0.00 | 0.5443702 | 0 |
| TOTAL CYCLE | 2598960.00 | | 2375298.44 | | 119172309.00 | 0.4556298 | 0.9170769 |

| | |
|---|---|
| MAX NUMBER OF COINS | 50 |
| TOTAL HITS | 1184163.63 |
| HITS ONE IN: | 2.19 |
| HIT % | 45.56 % |
| MIN PAYOUT % | 91.39 % |
| MAX PAYOUT % | 91.71 % |

FIG. 4a

JACKS OR BETTER 91.79 % (ADJUSTED)

| HANDS | OCCURRENCE | MIN PAYS | TOTAL | MAX PAYS | TOTAL | PROBABILITY | MAX EXPECTED VALUE |
|---|---|---|---|---|---|---|---|
| ROYAL FLUSH | 54.32 | 250 | 13579.57 | 20000 | 1086365.28 | 0.0000209 | 0.00836 |
| STRAIGHT FLUSH | 274.45 | 50 | 13722.51 | 2500 | 686125.44 | 0.0001056 | 0.00528 |
| FOUR OF A KIND | 6141.86 | 70 | 429930.36 | 3500 | 21496517.95 | 0.0023632 | 0.165424 |
| FULL HOUSE | 29922.61 | 6 | 179535.64 | 300 | 8976781.85 | 0.0115133 | 0.0690798 |
| FLUSH | 29677.26 | 5 | 148386.32 | 250 | 7419316.09 | 0.0114189 | 0.0570945 |
| STRAIGHT | 29093.02 | 4 | 116372.07 | 200 | 5818603.63 | 0.0111941 | 0.0447764 |
| THREE OF A KIND | 193432.54 | 3 | 580297.61 | 150 | 29014880.40 | 0.0744269 | 0.2232807 |
| TWO PAIR | 335709.22 | 1 | 335709.22 | 50 | 16785461.13 | 0.1291706 | 0.1291706 |
| JACK OR BETTER | 559858.35 | 1 | 559858.35 | 50 | 27992917.35 | 0.2154163 | 0.2154163 |
| NO PAIRS | 1414796.37 | 0 | 0.00 | 0 | 0.00 | 0.5443702 | 0 |
| TOTAL CYCLE | 2598960.00 | | 2377391.64 | | 119276969.12 | 0.4556298 | 0.9178823 |

| | |
|---|---|
| MAX NUMBER OF COINS | 50 |
| TOTAL HITS | 1184163.63 |
| HITS ONE IN: | 2.19 |
| HIT % | 45.56 % |
| MIN PAYOUT % | 91.47 % |
| MAX PAYOUT % | 91.79 % |

FIG. 4b

SELF-LEARNING GAMING MACHINE

FIELD OF THE INVENTION

The present invention relates generally to gaming machines and, more particularly, to a self-learning gaming machine that adjusts a parameter of a game for future plays based on a player's selection affecting an outcome of a current play.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

SUMMARY OF THE INVENTION

A self-learning gaming machine comprises a game of chance executed by a processor in response to a wager. The game includes a plurality of symbol-bearing indicia and an adjustable parameter. The adjustable parameter is adjusted by the processor for future plays of the game based on a player's selections affecting outcomes of at least one previous plays. During the previous play, the player's selection is made after the plurality of symbol-bearing indicia are displayed.

BRIEF DESCRIPTION OF THE DRAWINGS

The foregoing and other advantages of the invention will become apparent upon reading the following detailed description and upon reference to the drawings.

FIGS. 4*a* and 4*b* are a default math table and an adjusted math table, respectively;

Figure 1:
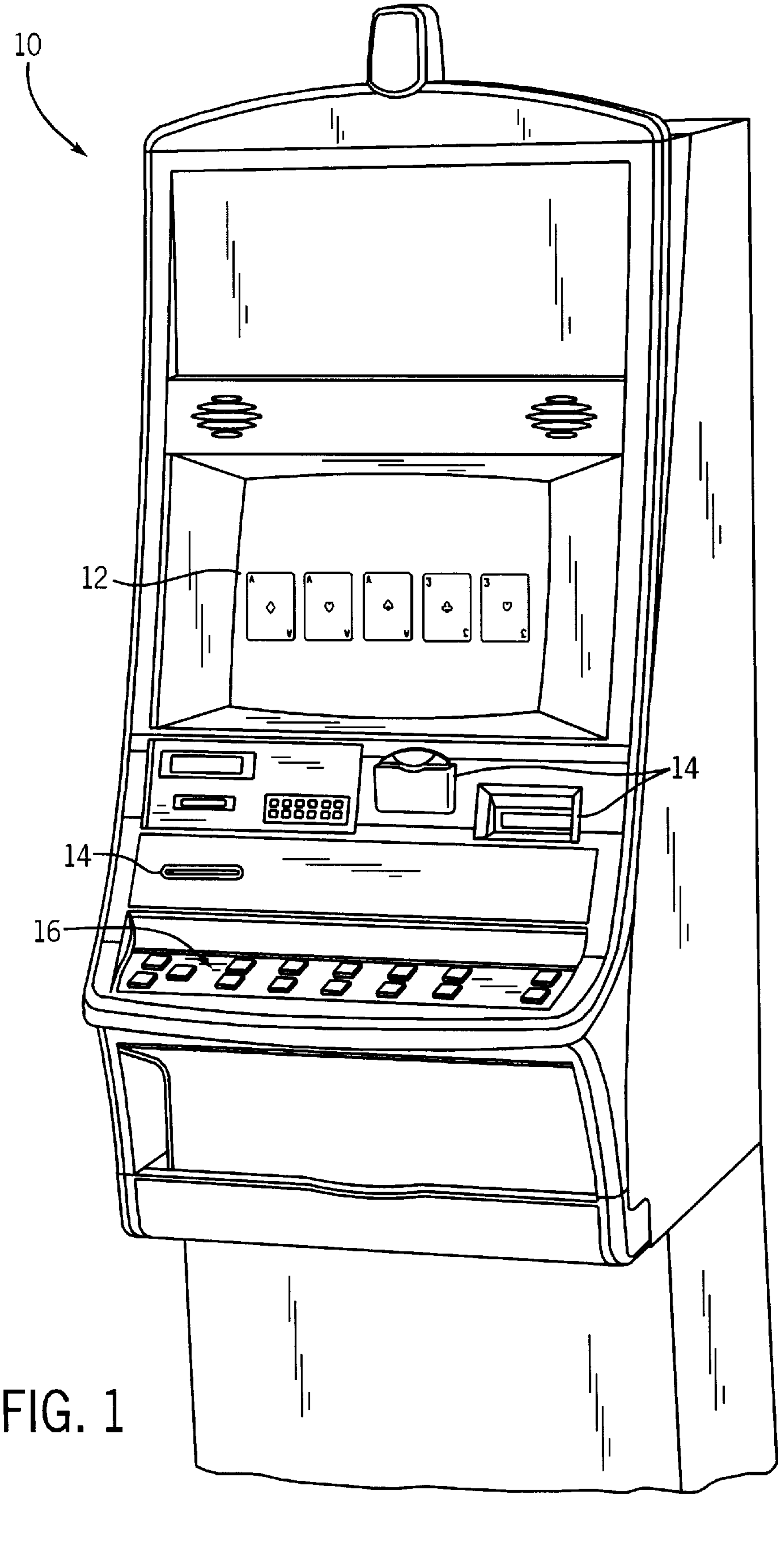
FIG. 1 is a perspective view of a gaming machine embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings, FIG. 1 illustrates is a perspective view of a processor-controlled gaming machine 10 that adjusts a parameter of a game of chance for future plays based on a player's selection affecting an outcome of a current play. The gaming machine 10 includes a visual display 12 preferably in the form of a dot matrix, CRT, LED, LCD, electro-luminescent, or other type of video display known in the art. If the display 12 is a video display, the display 12 is preferably overlaid with a touch screen. In the illustrated embodiment, the gaming machine 10 is an "upright" version in which the display 12 is oriented vertically relative to the player. Alternatively, the gaming machine may be a "slant-top" version in which the display 12 is slanted at about a thirty-degree angle toward the player of the gaming machine 10.

The gaming machine 10 includes a plurality of possible credit receiving mechanisms 14 for receiving credits to be used for placing wagers in the game. The credit receiving mechanisms 14 include, for example, a coin acceptor, a bill acceptor, a ticket acceptor, and a card reader. The bill and ticket acceptors may be combined into a single unit. The card reader may, for example, accept magnetic cards and smart (chip) cards. If the gaming machine 10 stands alone and is not linked to a central system, the tickets and cards are preferably coded with a credit amount. Upon insertion of such a ticket or card into the gaming machine 10, this credit amount is added to the machine's credit meter. If, however, the gaming machine 10 is linked to is a central accounting database, the tickets and cards may merely identify a player's account. Upon insertion of such a ticket or card into the machine 10, the credit amount in the player's account is downloaded from the accounting database to the machine 10.

The gaming machine 10 includes a plurality of pushbuttons 16 for placing wagers and initiating a play of the game. These pushbuttons may, for example, include a bet-one credit pushbutton, a bet-maximum credit pushbutton, and a deal or spin-reels pushbutton depending upon the nature of the game. Corresponding soft touch keys are preferably depicted on the display 12 so that the player can place a wager and initiate a play using either the soft touch keys or the pushbuttons.

In response to receiving a wager and a command to initiate play, the central processing unit (CPU) of the gaming machine 10 randomly selects a game outcome from a plurality of possible outcomes for a preliminary stage of the game being executed on the gaming machine. The CPU causes the display 12 to depict a plurality of symbol-bearing indicia representative of the selected preliminary game outcome. In the case of draw poker, the plurality of symbol-bearing indicia include five playing cards from a deck of 52 cards. The cards are shown with their numbers and suits revealed. In the case of slots, the plurality of symbol-bearing indicia include mechanical or simulated slot reels that are rotated and stopped to place symbols on the reels in visual association with one or more pay lines. If the slot reels are mechanical, the reels are primarily contained with the machine housing but project through respective slots in a front side of the housing. The display 12 includes a transparent window through which the mechanical slot reels may be viewed.

After the plurality of symbol-bearing indicia are displayed during the current play, the gaming machine 10 receives a player's selection of one or more game play elements that influence an outcome of the play. In the case of draw poker, for example, the player may select which of the playing cards to hold and which of the playing cards to discard. In the case of slots, for example, the slot game may be a hold-and-respin game that permits the player to hold the results of one or more reels and spin the remaining reels a second time in an attempt to improve the result. To select which cards or reels to hold and which cards or reels to "discard," the plurality of pushbuttons 16 may include hold/discard pushbuttons for holding or discarding corresponding ones of the cards or reels. Corresponding soft touch keys are preferably depicted on the display 12 if it is a video display.

In response to the player's selection, the CPU randomly selects a game outcome from a plurality of possible outcomes for a final stage of the game being executed on the gaming machine. The CPU causes the display 12 to depict symbol-bearing indicia representative of the selected final game outcome. In the case of draw poker, the held cards remain on the display 12 while the discarded cards are replaced with new cards randomly selected from remaining cards in the deck. The new cards are shown with numbers and suits revealed. In the case of slots, the held reels continue to show the same respective symbols on the display 12 while the "discarded" reels are respun and stopped to place the same or different symbols on the respun reels in visual association with the one or more pay lines.

System memory stores control software, operational instructions and data associated with the gaming machine 10. In one embodiment, the memory comprises a separate read-only memory (ROM) and battery-backed random-access memory (RAM). However, it will be appreciated that the system memory may be implemented on any of several alternative types of memory structures or may be implemented on a single memory structure. The system memory contains a math table identifying, among other things, the plurality of possible final game outcomes, a number of expected occurrences (hits) of each outcome in a total cycle, a payout for each outcome, a probability of hitting each outcome, and an expected value for each outcome. Each payout corresponds to a certain credit amount. If the final game outcome is associated with a payout and is therefore considered a "winning" outcome, the CPU adds the credit amount for that payout to the machine's credit meter.

Instead of or in addition to a payout, the final game outcome may trigger a bonus game that allows the player to win additional money through an activity other than the main card or slot game. An example of such a bonus game is a gamble feature that presents a plurality of player-selectable strategy options to a player for selection. The player selects one of the strategy options to generate a first bonus amount. The player then has the option of keeping the first bonus amount or returning it in favor of selecting a different strategy option associated with a second bonus amount. This process of permitting the player to gamble by returning a bonus amount in an attempt to improve the result may be repeated a predetermined number of times.

After the current play is completed, the player may discontinue play and cash out by pressing a "collect" pushbutton or soft touch key. Alternatively, the player may place another wager and initiate another play of the game as described above. As noted above, the game of chance is interactive in that, after the plurality of symbol-bearing indicia are initially displayed during the play, the game requires the player to make at least one selection (either in the main game or the bonus game) that influences an outcome of the play. In accordance with the present invention, based on the player's selections during one or more previous plays, the CPU adjusts one or more parameters of the game for future plays. In other words, the CPU learns from the player's selections by adjusting one or more parameters of the game for future plays. The adjustable parameters may, for example, include a recommendation by the CPU to the player as to which of the symbol-bearing indicia to hold or discard during the main game; a frequency of hitting (registering) any of the winning outcomes; the payout associated with one or more of the possible game outcomes in the math table; the probability associated with one or more of the possible game outcomes in the math table; a volatility index for the game where the volatility index represents the ratio of size versus frequency of payouts; the content (e.g., bonus amount) of one or more of the player-selectable strategy options; and a frequency of hitting the game outcome that triggers a bonus game. Examples of how the CPU may adjust some of the foregoing parameters are discussed in detail below in the context of both a draw poker game and a slot game. Any adjusted parameters are preferably reset to their default values after the player cashes out.

Figure 2A:
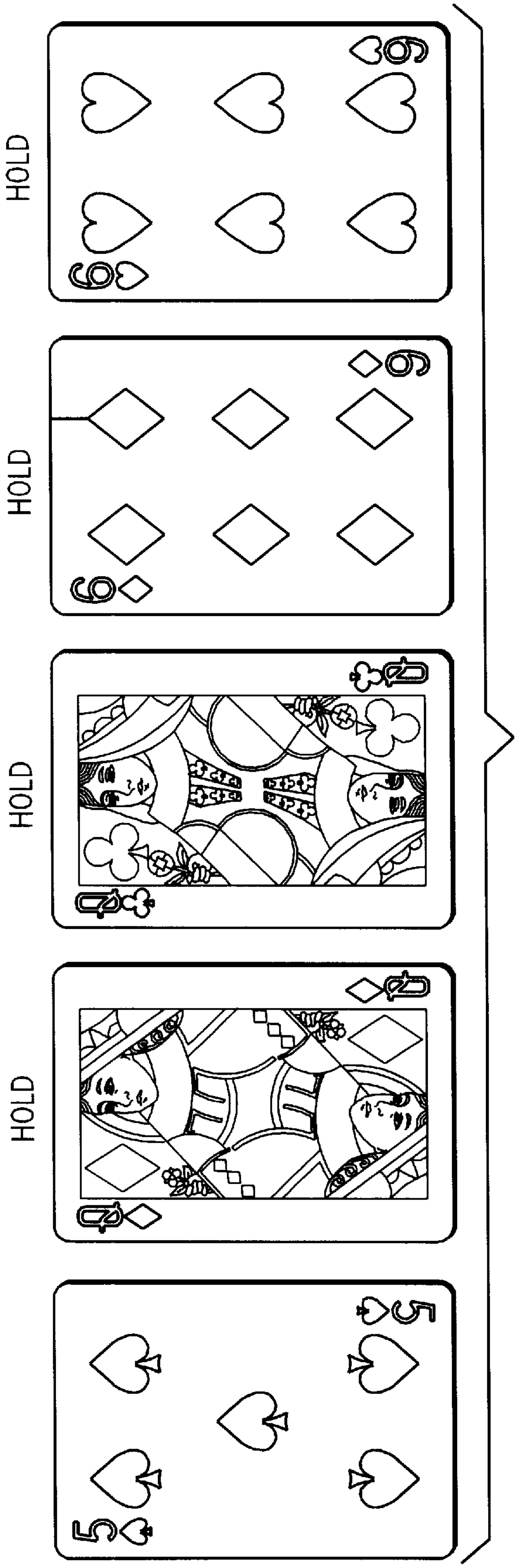
FIGS. 2*a* and 2*b* are display screen captures for a hand of a draw poker game using a default draw recommendation.
Figure 2B:
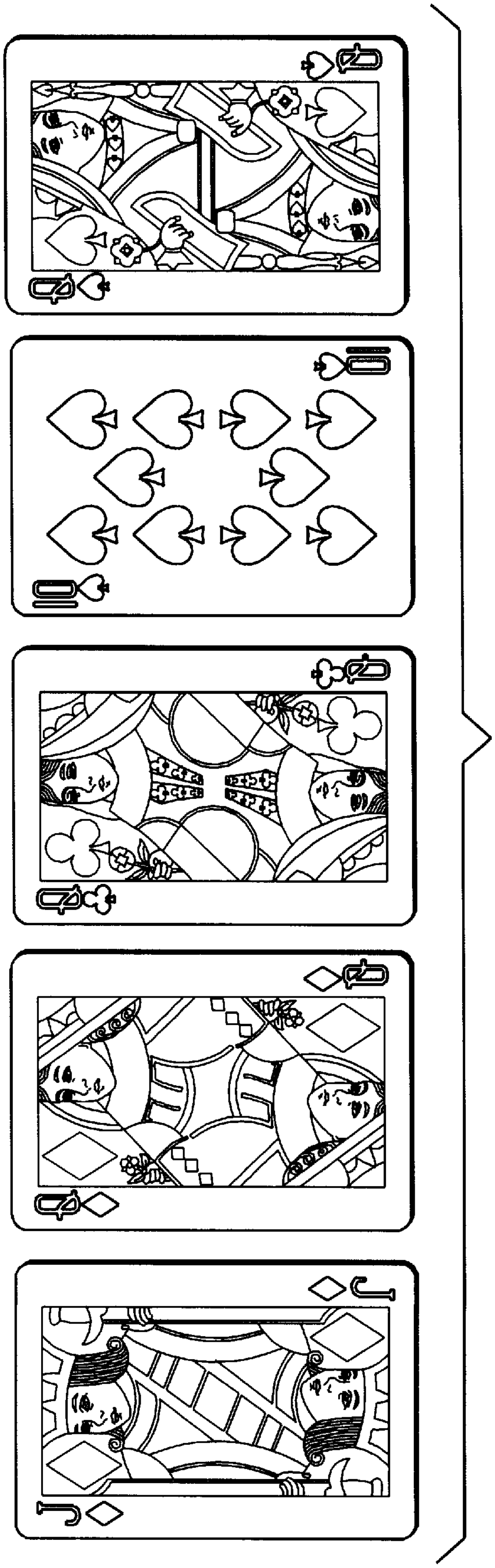
Figure 3A:
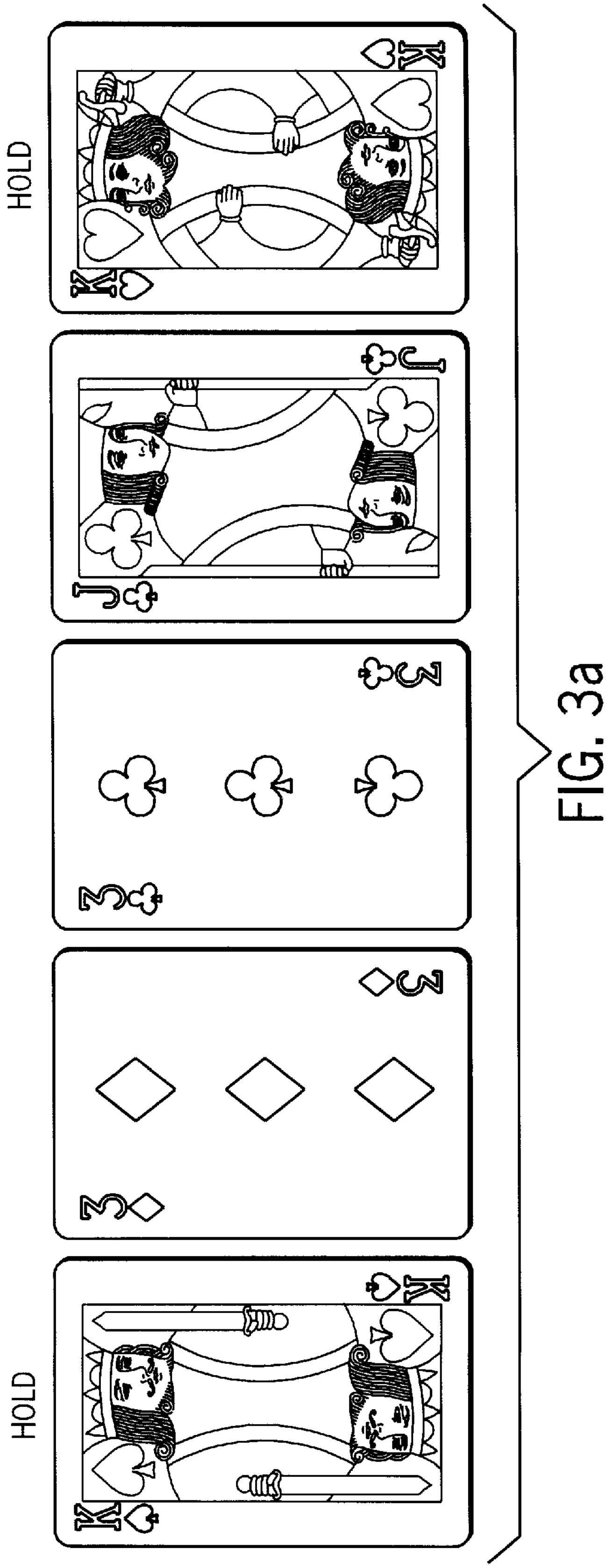
FIGS. 3*a* and 3*b* are display screen captures for a hand of the draw poker game using an adjusted draw recommendation.
Figure 3B:
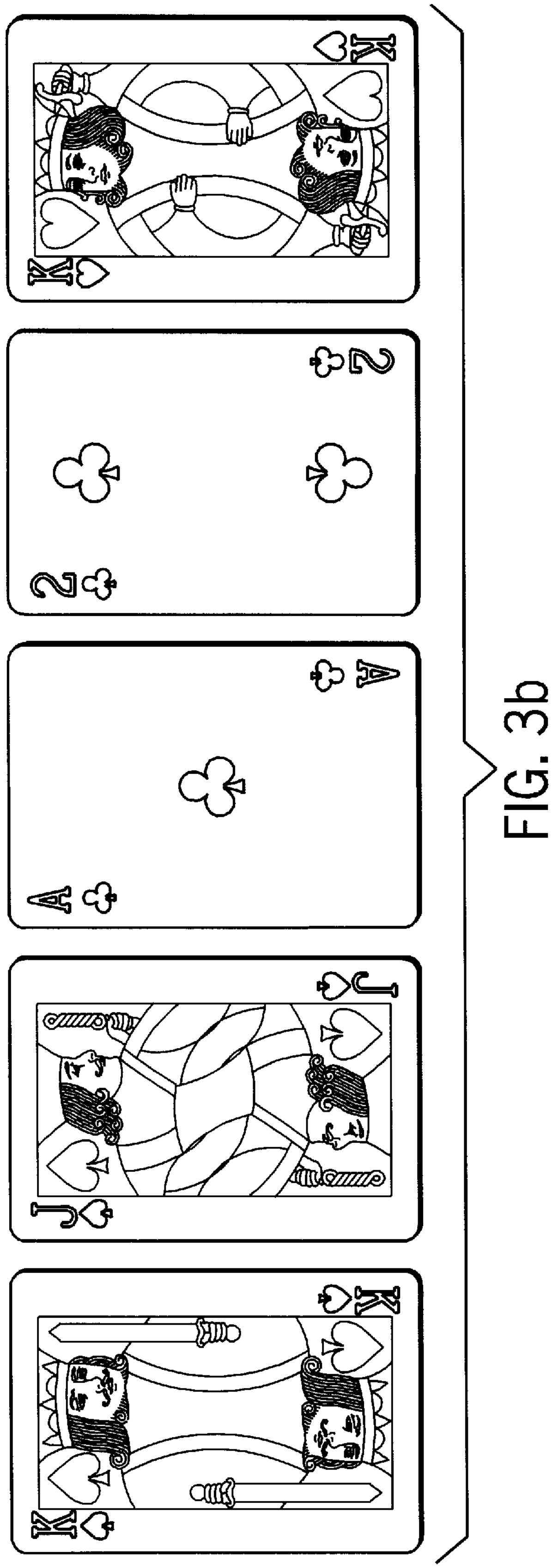

In a first example employed in a draw poker game called Jacks or Better, the adjusted parameter is a draw recommendation by the CPU to the player as to which of the initially dealt cards to hold or discard. FIGS. 2*a* and 2*b* are display screen captures for a hand of the draw poker game using a default draw recommendation. FIGS. 3*a* and 3*b* are display screen captures for a hand of the draw poker game using an adjusted draw recommendation.

FIG. 2*a* depicts a draw poker hand initially dealt to a player and prior to replacing any cards. The hand is illustrated as including two pairs, namely a 6♥, 6♦, Q♣, Q♦, and 5♠. The CPU's recommendations as to which cards to hold and therefore which cards to discard are shown above the cards. In this case, the CPU is recommending that the player hold the two pairs and discard the 5♠. Despite the CPU's recommendations, the player may choose to hold only the Q♣ and Q♦ and discard the 6♥, 6♦, and 5♠ in an attempt to go for three or four of a kind. FIG. 2*b* depicts a possible resulting hand after replacing the 6♥, 6♦, and 5♠, if the player in fact does choose to hold only the Q♣ and Q♦. Based on the foregoing selection of the player to hold only the pair instead of the two pairs, the CPU may adjust its draw recommendation for future plays of the draw poker game. This adjustment may be made based on one previous play or on multiple previous plays in which the player consistently holds only a pair when dealt two pairs.

FIG. 3*a* depicts an adjusted draw recommendation for a later hand dealt to the player. Once again, the hand includes two pairs, namely K♠, 3♦, 3♣, J♣, and K♥, but this time the CPU recommends that the player hold only the K♠ and K♥. Based on the player's selection to hold only the pair in a similar previous scenario in FIGS. 2*a* and 2*b*, the CPU has learned that the player is willing to gamble for higher awards at the expense of sacrificing smaller awards. The player may choose to hold only the K♠ and K♥, as now recommended by the CPU, or may change his or her strategy and also hold 3♦ and 3♣. Assuming the player remains consistent and only holds the K♠ and K♥, FIG. 3*b* depicts a possible resulting hand after replacing the 3♦, 3♣, and J♣.

In a second example employed in the Jacks or Better draw poker game, the adjusted parameter is the payout associated with one or more of the possible game outcomes in the math table. FIGS. 4*a* and 4*b* are a default math table and an adjusted math table, respectively, stored in system memory. Referring to FIG. 4*a*, the default math table is in effect until, during one or more plays of the game, the player selects game play elements of the type that causes the CPU to learn from the player's selections and adjust one or more values in the math table. The default math table includes "hands", "occurrence", "min pays", "total", "max pays", "total", "probability", and "max expected value."

The "hands" column identifies the possible rankings for hands that may be dealt a player, ranging from a royal flush at the high end to no pair (or a pair of tens or less) at the low end. The "occurrence" column identifies, on average, the number of expected occurrences of each possible hand ranking in a total cycle of 2,598,960.00 hands. The "min pays" column identifies the payout for each possible hand ranking at a minimum wager of one coin. Because the game is Jacks or Better, a payout is associated with each hand ranking except for no pair (or a pair of tens or less). The first "total" column identifies the total payout for each possible hand ranking at a minimum wager of one coin based on the number of expected occurrences of a ranking in a total cycle of 2,598,960.00 hands. For each hand ranking, the first "total" column equals the "occurrence" column multiplied by the "min pays" column.

The "max pays" column identifies the payout for each possible hand ranking at a maximum wager of 50 coins. For each hand ranking, the "max pays" column equals 50 times the "min pays" column except for the highest hand ranking, royal flush, where the "max pays" column equals 80 times the "min pays" column. This max bet adder feature of disproportionately increasing the payout for one or more of the possible hand rankings (e.g., royal flush in this case) when the player wagers a maximum amount encourages the player to wager the maximum number of coins. The second "total" column identifies the total payout for each possible hand ranking at a maximum wager of 50 coins based on the number of expected occurrences of the ranking in a total cycle of 2,598,960.00 hands. For each hand ranking, the second "total" column equals the "occurrence" column multiplied by the "max pays" column.

The "probability" column equals the probability of occurrence of each possible hand ranking. For each hand ranking, the "probability" column equals the "occurrence" column divided by the total cycle of 2,598,960.00 hands. The "max expected value" column identifies the expected value of each hand ranking at a maximum wager of 50 coins. For each hand ranking, the "expected value" column equals the "probability" column multiplied by the "max pays" column and then divided by 50. The "max payout %" indicates the average amount of each coin wagered that, by the laws of mathematical probability, is returned to a player in jackpots when the player wagers the maximum number of coins. Similarly, the "min payout %" indicates the average amount of each coin wagered that, by the laws of mathematical probability, is returned to a player in jackpots when the player wagers the minimum number of coins. Because of the max bet adder feature referenced above, the "max payout %" is slightly greater than the "min payout %". The "max payout %" may be found by summing the values in the "max expected value" column and multiplying the sum by 100 to obtain a percentage. In this case, the "max payout %" is 91.71%.

From the default math table in FIG. 4*a*, it can be seen that the "min pays" and "max pays" for four of a kind is 15 coins and 750 coins, respectively, and for two pair is 2 coins and 100 coins, respectively. If the player adopts the "feast-or-famine" strategy of holding only one of two pairs when dealt two pair as in FIGS. 2*a*, 2*b*, 3*a*, and 3*b*, the CPU may adjust the "min pays" and "max pays" columns to be consistent with and induce the player to continue this strategy. Specifically, referring to FIG. 4*b*, the CPU may adjust the "min pays" and "max pays" for four of a kind to be 70 coins and 3500 coins, respectively, and for two pair to be 1 coin and 50 coins, respectively. This, in turn, increases the "max expected value" for four of a kind from 0.035448 to 0.165424 but decreases the "max expected value" for two pair from 0.2583412 to 0.1291706. The "max payout %" remains approximately the same, increasing only slightly from 91.71% to 91.79%.

In a third example employed in either the draw poker game or a slot game, the adjusted parameter is the content (e.g., bonus amount) of one or more player-selectable strategy options in a bonus game. The bonus game may be triggered by a start-bonus outcome in the main draw poker game or main slot game. In Jacks or Better draw poker, for example, the start-bonus outcome may be a specific hand, such as a pair of nines or a pair of tens, that does not generate a payout according to the pay table of the main draw poker game.

Figure 5A:
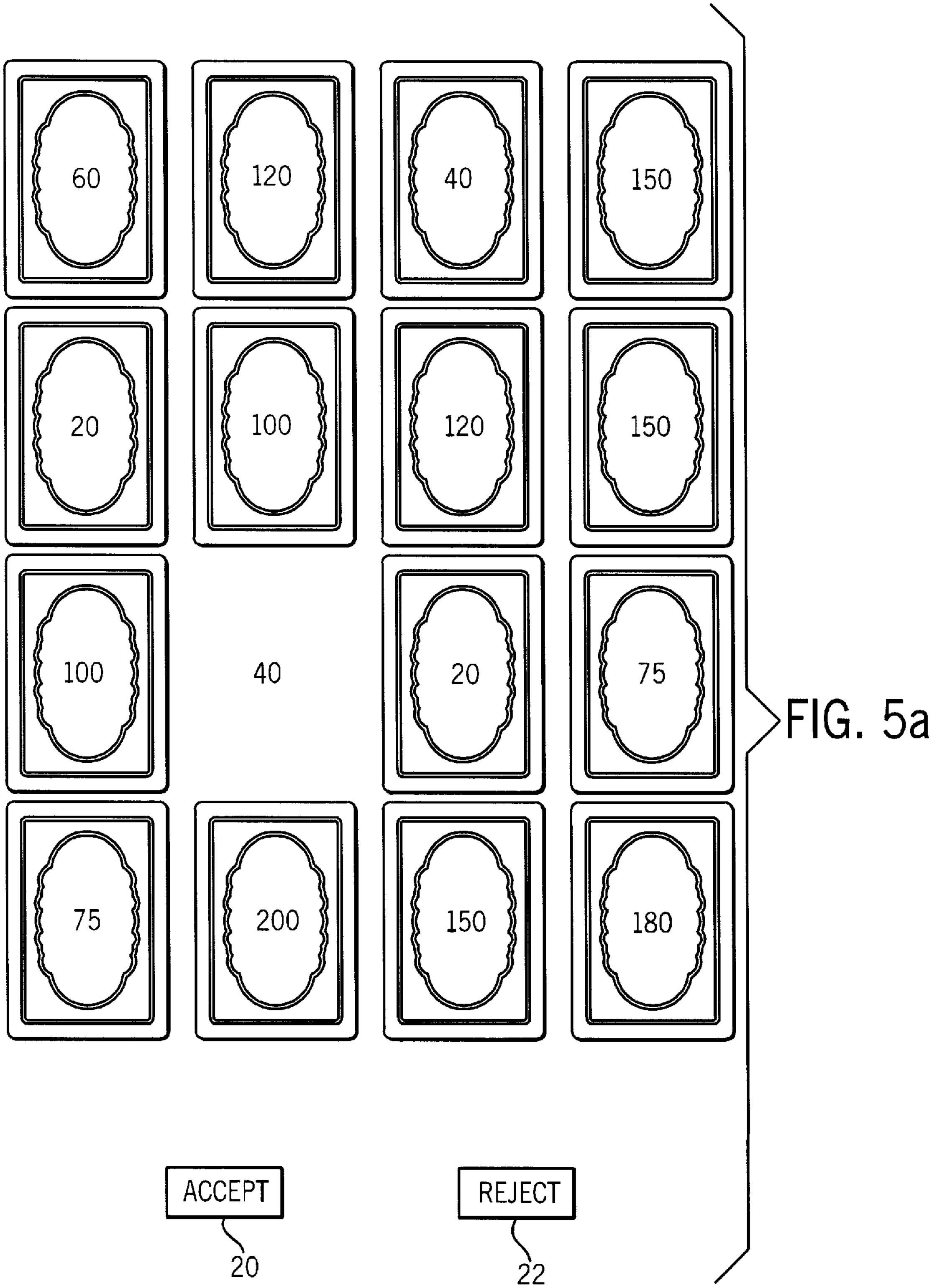
FIGS. 5*a* and 5*b* are screen captures of tile bonus game showing a grid of selectable tiles associated a default distribution of credit values.
Figure 5B:
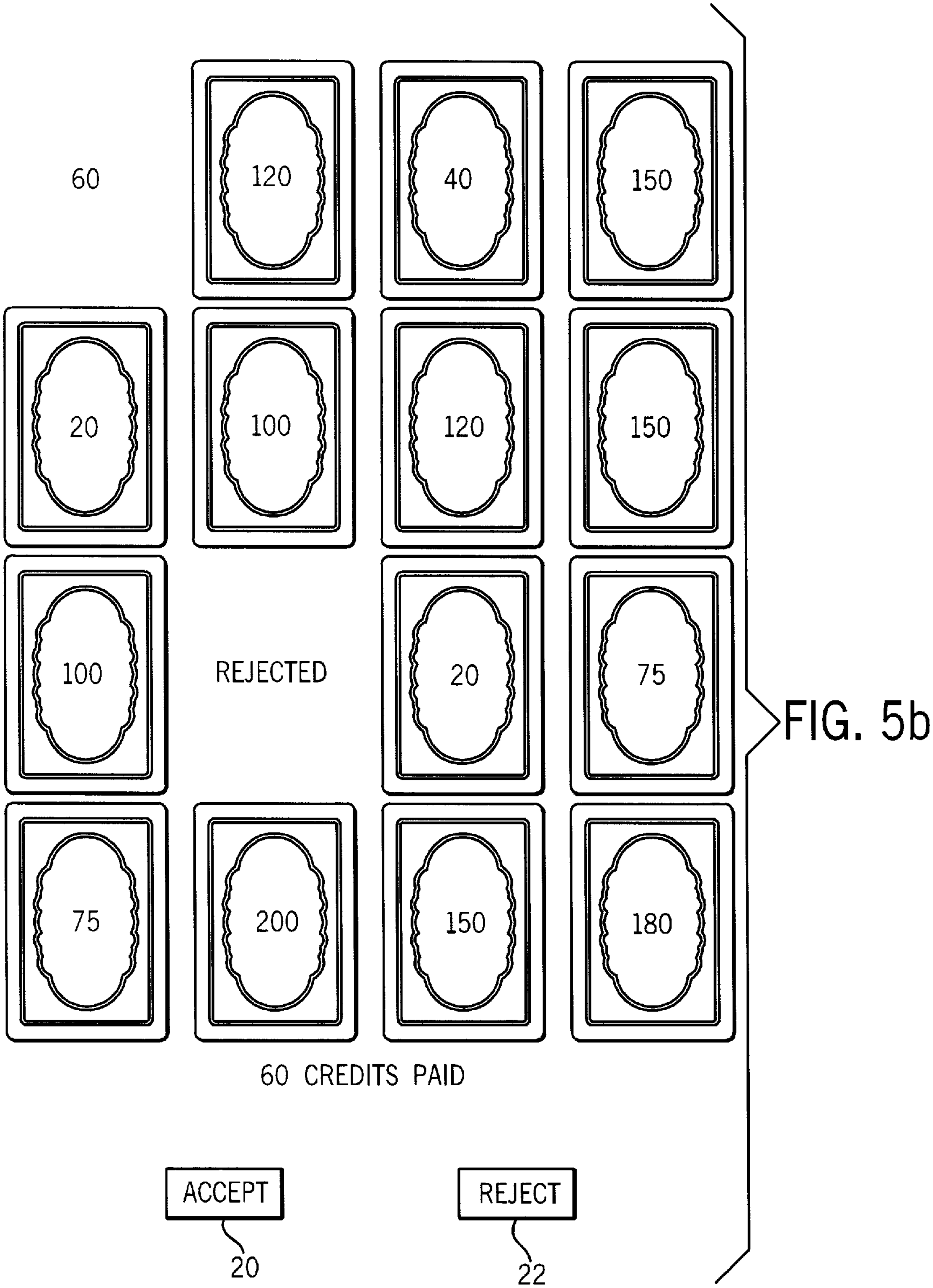

FIGS. 5*a* and 5*b* are screen captures of tile bonus game showing a plurality of default strategy options presented on the display 12 to a player for selection. Referring to FIG. 5*a*, the strategy options are in the form of a grid of 16 tiles. Each tile is worth between 20 and 200 credits. The credit value of each tile is initially concealed from view and is revealed upon selection of the tile by the player. In FIG. 5*a*, for example, a tile worth 40 credits has been selected. FIGS. 5*a* and 5*b* depict the credit values of the unselected tiles to facilitate explanation of how the content of the tiles is adjusted according to the present invention. The credit values of the unselected tiles are normally hidden from view. The distribution of default tile values in the grid is shown in Table 1 below:

TABLE 1

Default Distribution of Tile Values

| Value | Occurrence | Total |
|---|---|---|
| 20 | 2 | 40 |
| 40 | 2 | 80 |
| 60 | 1 | 60 |
| 75 | 2 | 150 |
| 100 | 2 | 200 |
| 120 | 2 | 240 |
| 150 | 3 | 450 |
| 180 | 1 | 180 |
| 200 | 1 | 200 |

Average Tile Value = 100

After the player selects one of the tiles to reveal a first credit value (e.g., 40 credits in FIG. 5*a*), the player is offered the option of accepting the credit value or rejecting the credit value in favor of another tile selection. If the player accepts the credit value, the CPU awards the accepted credit value to the player and ends the bonus game. If, however, the player rejects the credit value, the player makes another tile selection and is once again offered the option of accept or rejecting the credit value of the newly selected tile. This procedure of rejected the credit values of selected tiles may be repeated up to three times such that the credit value of the fourth selected tile is automatically awarded to the player. In the illustrated example, the player rejects the 40 credits in FIG. 5*a* by pressing a "reject" soft touch key 22 and selects another tile worth 60 credits in FIG. 5*b*. As denoted by the text "60 credits paid," this time the player elects to accept the 60 credits by pressing an "accept" soft tough key 20.

Suppose the player continues to play the gaming machine, trigger the tile bonus game on one or more subsequent occasions, and continues to accept a credit value in the tile bonus game equal to or greater than 60 but reject credit values below 60. Based on the player's selection to accept credit values at a certain threshold, the CPU may adjust the distribution of tile values in the grid to be as shown in Table 2 below:

TABLE 2

Adjusted Distribution of Tile Values

| Value | Occurrence | Total |
|---|---|---|
| 60 | 2 | 120 |
| 70 | 1 | 70 |
| 75 | 2 | 150 |
| 80 | 3 | 240 |
| 100 | 2 | 200 |
| 110 | 2 | 220 |
| 125 | 2 | 250 |
| 150 | 1 | 150 |
| 200 | 1 | 200 |
| Average Tile Value = 100 | | |

Figure 6:
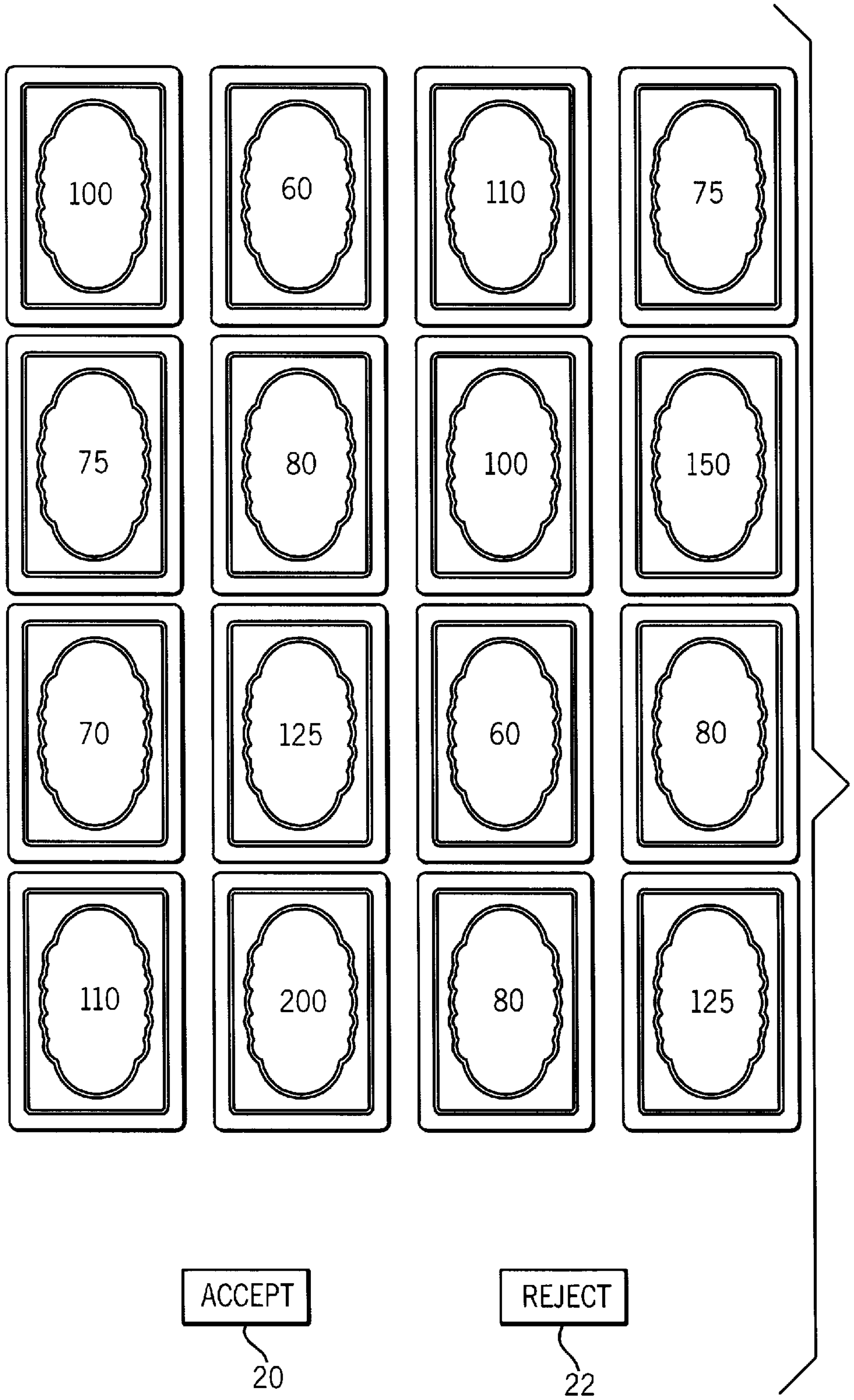
FIG. 6 is a screen capture of tile bonus game showing the grid of selectable is tiles associated an adjusted distribution of credit values.

FIG. 6 is a screen capture of tile bonus game showing the grid of tiles with adjusted distribution of credit values. As noted above in connection with FIGS. 5*a* and 5*b*, the credit values of unselected tiles are normally hidden from view but are shown in FIG. 6 to facilitate explanation of how the content of the tiles is adjusted according to the present invention.

By comparing Tables 1 and 2 and FIGS. 5*a*–*b* and 6, it can be seen that some new credit values have been introduced in the adjusted distribution of tile values, but the average amount won by the player remains the same. With the adjusted distribution of tile values, the player may become more interested in the tile bonus game and therefore the gaming machine as a whole, because the player is not offered any tile values below his/her prior acceptance threshold of 60 and therefore is compelled to adopt a new play strategy.

Figure 7A:
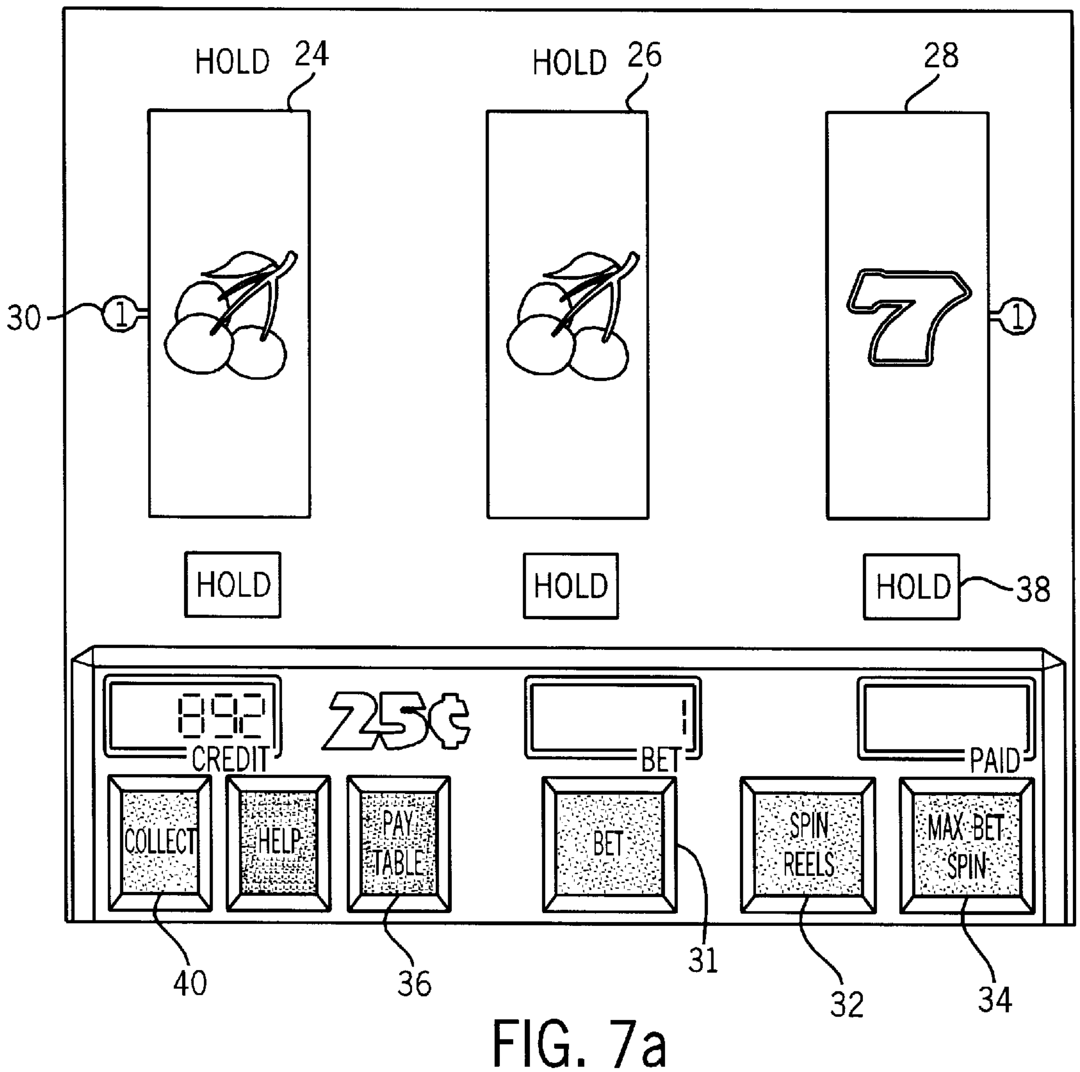
FIGS. 7*a* and 7*b* are display screen captures for a play of the slot game using a default re-spin recommendation.

In a fourth example employed in a hold-and-respin slot game, the adjusted parameter is a re-spin recommendation by the CPU to the player as to which of the initially spun and stopped reels to hold or re-spin. Referring to FIG. 7*a*, the three-reel, one-line slot game includes three reels 24, 26, and 28 and a single horizontal pay line 30 passing through the middle symbol on each reel. Although the reels are illustrated as being simulated on a video display, the reels may alternatively be mechanical and driven by stepper motors.

Generally, a player initiates game play by inserting a number of coins or by selecting a number of credits to bet using the "Bet" key 31. The reels may then be set in motion by touching the "Spin Reels" key 32 or, if the player wishes to bet the maximum amount, by using the "Max Bet Spin" key 34. Alternatively, other mechanisms such as, for example, a lever or push button may be used to set the reels in motion. The CPU uses a random number generator to select a game outcome corresponding to a particular set of reel "stop positions." The CPU then causes each of the reels to stop at the appropriate stop position. Symbols are displayed on the reels to graphically illustrate the reel stop positions and indicate whether the stop positions of the reels represent a winning game outcome. In the illustrated embodiment, the reel symbols include 7, Bell, Cherry, and Blank and are laid out on the reels as shown below:

TABLE 3

Reel Strips for Slot Game

| Reel 1 | Reel 2 | Reel 3 |
|---|---|---|
| 7 | 7 | 7 |
| Blank | Blank | Blank |
| Bell | Bell | Bell |
| Blank | Blank | Blank |
| Cherry | Cherry | Cherry |
| Blank | Blank | Blank |

After the reels 24, 26, and 28 are spun and stopped once, the game permits the player to hold the results of one or more reels and spin the remaining reels a second time in an attempt to improve the result. To select which reels to hold and which reels to re-spin, the plurality of pushbuttons 16 (see FIG. 1) may include hold/discard pushbuttons for holding or re-spinning corresponding ones of the reels. Corresponding soft touch keys 38 are preferably depicted on the display 12 if it is a video display.

Winning outcomes (e.g., symbol combinations resulting in payment of coins or credits) are identifiable to the player by a pay table. In one embodiment, the pay table is affixed to the machine and/or displayed by the video display in response to a command by the player (e.g., by pressing the "Pay Table" button 36). A winning outcome occurs when the symbols appearing on the reels 24, 26, and 28 along the pay line 30 correspond to one of the winning combinations on the pay table. An example of a pay table is shown below:

TABLE 4

Pay Table for Slot Game

| Symbol Combination | | | Payout |
|---|---|---|---|
| 7 | 7 | 7 | 50 |
| Bell | Bell | Bell | 20 |
| Cherry | Cherry | Cherry | 10 |
| Blank | Blank | Blank | 1 |

If the displayed symbols stop in a winning combination (after any non-held reels have been re-spun), the game credits the player an amount corresponding to the award in the pay table for that combination multiplied by the number of credits bet. The player may collect the amount of accumulated credits by pressing the "Collect" button 40.

Figure 7B:
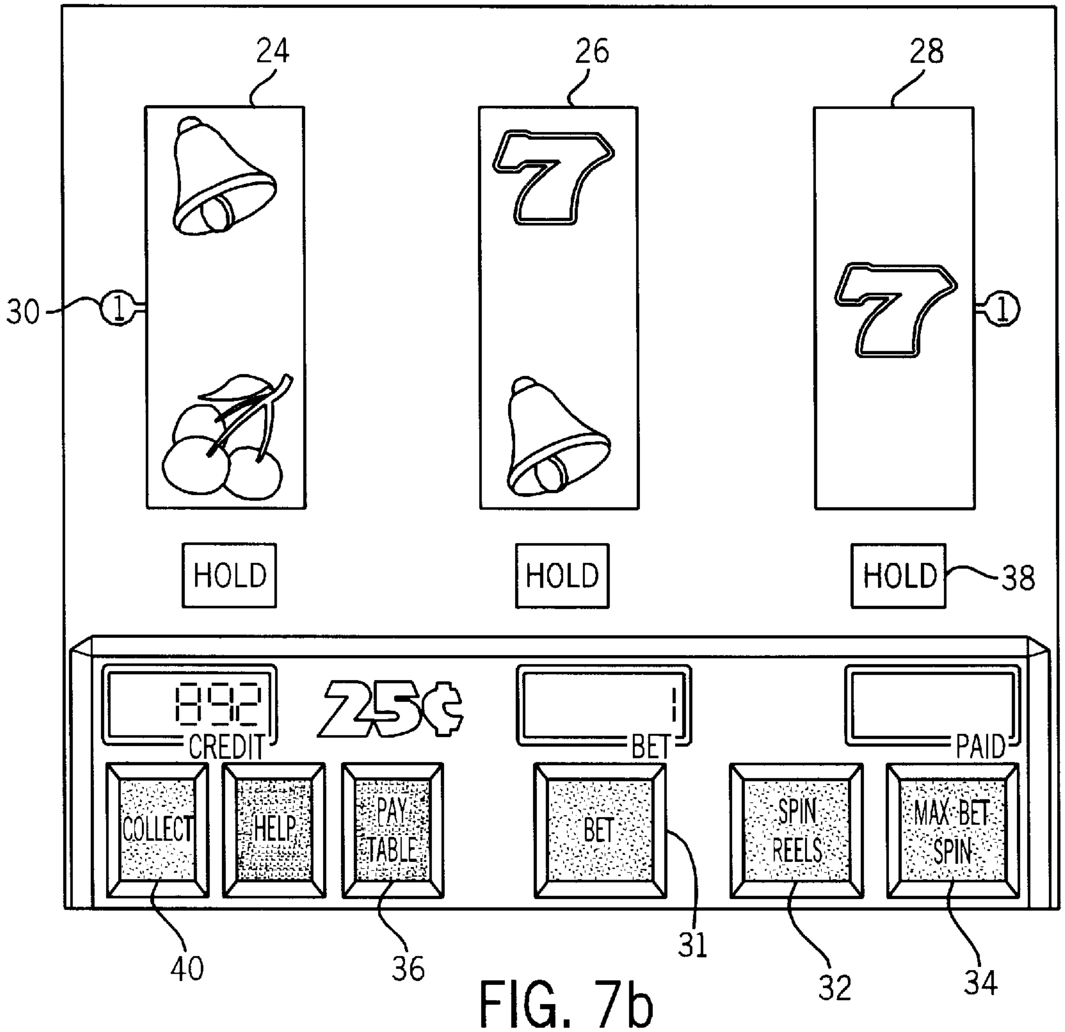
Figure 8A:
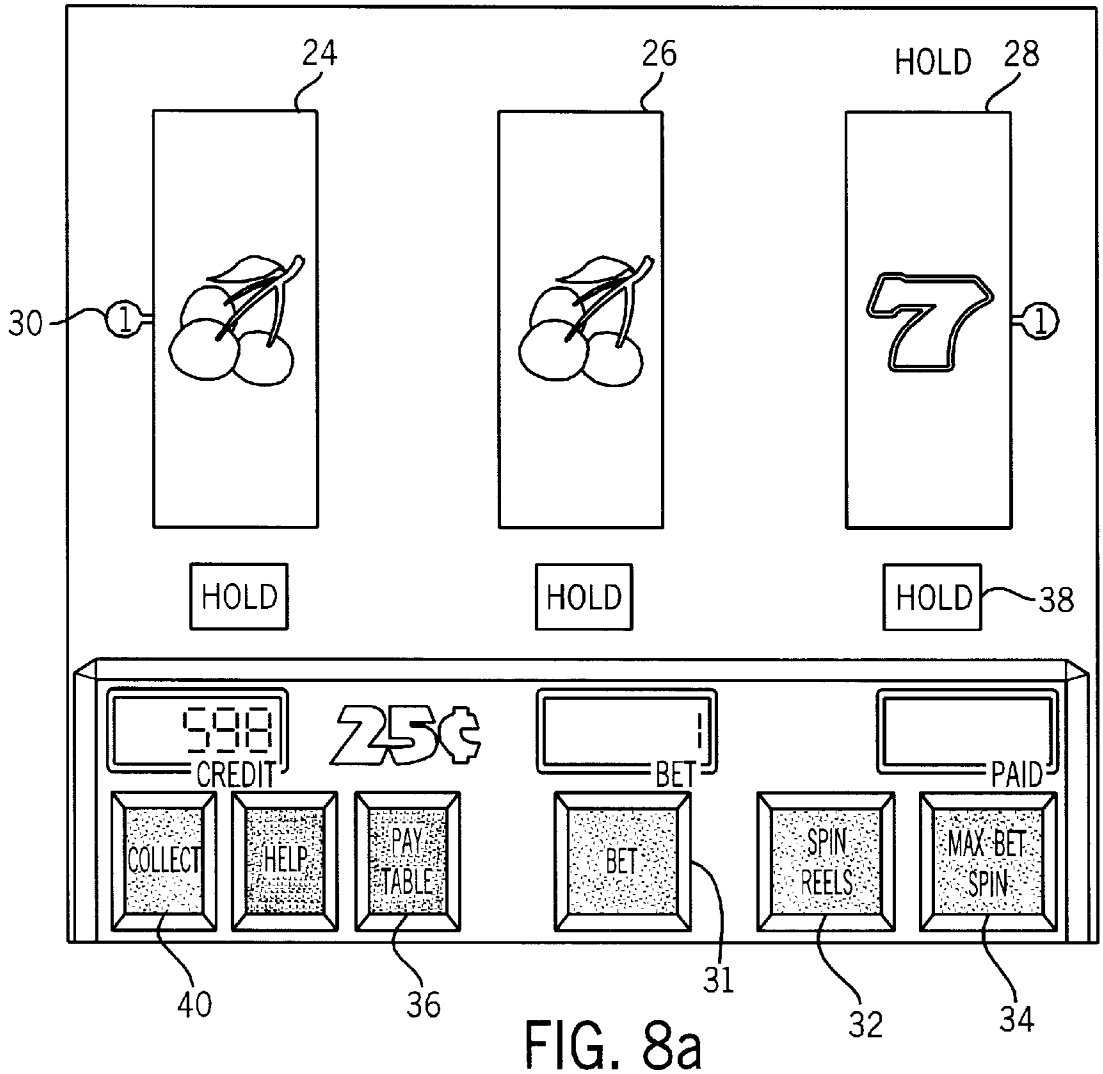
FIGS. 8*a* and 8*b* are display screen captures for a play of the slot game using an adjusted re-spin recommendation.
Figure 8B:
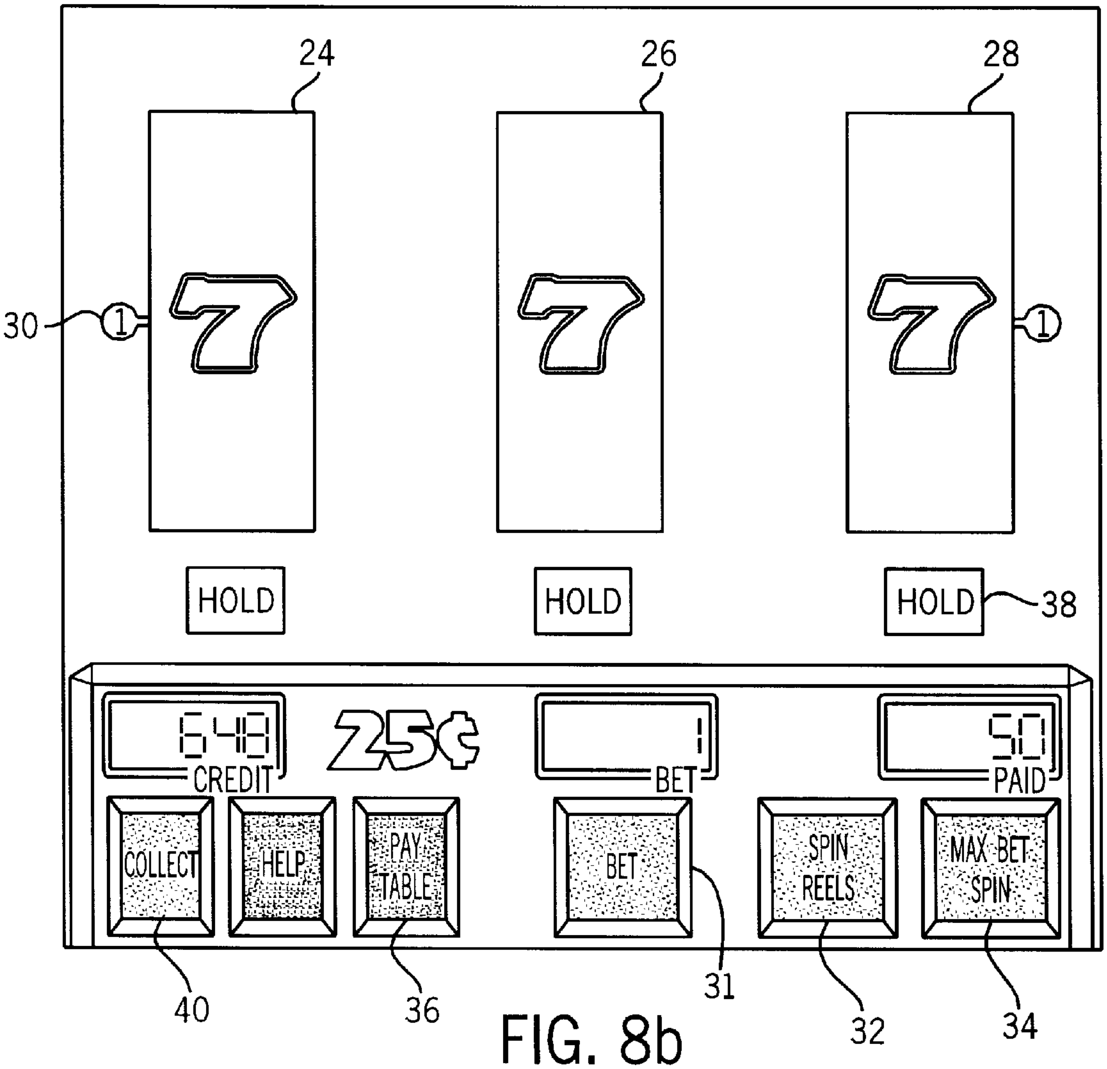

FIGS. 7*a* and 7*b* are display screen captures for a play of the slot game using a default re-spin recommendation. FIGS. 8*a* and 8*b* are display screen captures for a play of the slot game using an adjusted re-spin recommendation.

FIG. 7*a* depicts a spinning reel display after the reels 24, 26, and 28 have been spun once. The reel display is illustrated as including a symbol combination of Cherry, Cherry, 7 along the pay line 30. In this case, the player would likely hold either (1) hold the two Cherries and re-spin reel 28 or (2) bold the 7 and re-spin reels 24 and 26. By holding two Cherries and re-spinning reel 28, the probability of obtaining a winning combination of Cherry, Cherry, Cherry is 1/6. Referring to the pay table above, the associated payout for this winning combination is 10, thereby yielding an expected value of (1/6×10)=1.66. In contrast, by holding the 7 and re-spinning reels 24 and 26, the probability of obtaining a winning combination of 7, 7, 7 is (1/6×1/6)=1/36. Referring to the pay table above, the associated payout for this winning combination is 50, thereby yielding an expected value of (1/36×50)=1.39. Therefore, it can be seen that the best strategy is to hold the two Cherries and re-spin reel 28. In accordance with this strategy, the CPU recommends that the player hold the two Cherries and discard the 7. The CPU's recommendations are shown above the reels.

Despite the CPU's recommendations, the player may choose to hold only the 7 and re-spin reels 24 and 26 in an attempt to go for three 7's. FIG. 7*b* depicts a possible resulting symbol combination after replacing the two Cherries, if the player in fact does choose to hold only the 7. Based on the foregoing selection of the player to hold only the 7 instead of the two Cherries, the CPU may adjust its re-spin recommendation for future plays of the slot game. This adjustment may be made based on one previous play or on multiple previous plays. The adjustment may be based on previous plays as specific as holding a single 7 over a pair of Cherries, as general as hold a single higher-valued symbol over a pair of lower-valued symbols, or somewhere in between.

FIG. 8*a* depicts an adjusted re-spin recommendation for a later play of the slot game. Once again, the reel display is illustrated as including a symbol combination of Cherry, Cherry, 7 along the pay line 30, but this time the CPU recommends that the player hold only the 7 and re-spin reels 24 and 26. Based on the player's selection to hold only the 7 in a similar previous scenario in FIGS. 7*a* and 7*b*, the CPU has learned that the player is willing to gamble for higher awards at the expense of sacrificing smaller awards. The player may choose to hold only the 7, as now recommended by the CPU, or may change his or her strategy and instead hold the two Cherries. Assuming the player remains consistent and only holds the 7, FIG. 8*b* depicts a possible resulting symbol combination after replacing the two Cherries.

In a second example employed in the slot game, the adjusted parameter is the payout associated with one or more of the possible game outcomes in the pay table. Table 4 above is a default pay table that is in effect until, during one or more plays of the game, the player selects game play elements of the type that causes the CPU to learn from the player's selections and adjust one or more values in the pay table. From the default pay table of Table 4 above, it can be seen that the payout for a winning symbol combination of 7, 7, 7 is 50 coins. If the player adopts the "feast-or-famine" strategy of holding a single 7 over a pair of Cherries, the CPU may adjust the payout for 7, 7, 7 to be consistent with and induce the player to continue this strategy. Specifically, the CPU may increase the payout for 7, 7, 7 to 60 from 50 and compensate for this increased payout by reducing the payout for one of the other winning symbol combinations.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of operating a game of chance on a gaming machine, comprising:

(a) receiving a wager to initiate a play of the game;

(b) displaying a plurality of symbol-bearing indicia during the play;

(c) after displaying the plurality of symbol-bearing indicia during the play, receiving a player's selection affecting an outcome of the play; and (d) based on the player's selection, adjusting a parameter of the game for future plays.

2. The method of claim 1, wherein the game is a card game and the plurality of symbol-bearing indicia are playing cards.

3. The method of claim 1, wherein the game is a slot reel game and the plurality of symbol-bearing indicia are mechanical or simulated slot reels.

4. The method of claim 1, wherein the player's selection identifies which of the symbol-bearing indicia to hold or discard.

5. The method of claim 4, further including making a recommendation to the player as to which of the symbol-bearing indicia to hold or discard, and wherein adjusting a parameter of the game for future plays includes adjusting the recommendation.

6. The method of claim 1, wherein the game includes a plurality of winning outcomes, and wherein adjusting a parameter of the game for future plays includes adjusting a frequency of hitting any of the winning outcomes.

7. The method of claim 1, wherein the game includes a pay table having a plurality of winning outcomes and payouts associated with the respective winning outcomes, and wherein adjusting a parameter of the game for future plays includes adjusting one or more of the payouts.

8. The method of claim 1, wherein the game includes a plurality of possible outcomes and probabilities of hitting the respective possible outcomes, and wherein adjusting a parameter of the game for future plays includes adjusting one or more of the probabilities.

9. The method of claim 1, further including presenting a plurality of player-selectable strategy options; wherein receiving a player's selection affecting an outcome of the play includes receiving a player's selection of one or more of the strategy options, and wherein adjusting a parameter of the game for future plays includes adjusting the content of one or more of the strategy options presented to the player.

10. The method of claim 1, wherein the game is characterized by a volatility index, and wherein adjusting a parameter of the game for future plays includes adjusting the volatility index.

11. The method of claim 1, wherein the game includes a basic game and a bonus game, the basic game including a plurality of possible outcomes, the plurality of possible outcomes including a start-bonus outcome for triggering the bonus game, and wherein adjusting a parameter of the game for future plays includes adjusting a frequency of hitting the start-bonus outcome.

12. The method of claim 1, further including repeating steps (a), (b), and (c), and wherein adjusting a parameter of the game for future plays is based on the player's selections during one or more of the previous plays.

13. A self-learning gaming machine, comprising:

means for receiving a wager to initiate a play of a game of chance;

means for displaying a plurality of symbol-bearing indicia during the play;

means, after the plurality of symbol-bearing indicia are displayed during the play, for receiving a player's selection affecting an outcome of the play; and means, based on the player's selection during one or more of the previous plays, for adjusting a parameter of the game for future plays.

14. A self-learning gaming machine, comprising a game of chance executed by a processor in response to a wager, the game including a plurality of symbol-bearing indicia and an adjustable parameter, the adjustable parameter being adjusted by the processor for future plays of the game based on a player's selection affecting an outcome of at least one previous play, the player's selection being made after the plurality of symbol-bearing indicia are displayed during the previous play.

15. The machine of claim 14, wherein the game is a card game and the plurality of symbol-bearing indicia are playing cards.

16. The machine of claim 14, wherein the game is a slot reel game and the plurality of symbol-bearing indicia are mechanical or simulated slot reels.

17. The machine of claim 14, wherein the player's selection identifies which of the symbol-bearing indicia to hold or discard.

18. The machine of claim 17, wherein the game makes a recommendation to the player as to which of the symbol-bearing indicia to hold or discard, the adjustable parameter being the recommendation.

19. The machine of claim 14, wherein the game includes a plurality of winning outcomes, the adjustable parameter being a frequency of hitting any of the winning outcomes.

20. The machine of claim 14, wherein the game includes a pay table having a plurality of winning outcomes and payouts associated with the respective winning outcomes, the adjustable parameter being one or more of the payouts.

21. The machine of claim 14, wherein the game includes a plurality of possible outcomes and probabilities of hitting the respective possible outcomes, the adjustable parameter being one or more of the probabilities.

22. The machine of claim 14, wherein the game includes a plurality of player-selectable strategy options presented to a player for selection, the adjustable parameter being the content of one or more of the strategy options.

23. The machine of claim 14, wherein the game is characterized by a volatility index, the adjustable parameter being the volatility index.

24. The machine of claim 14, wherein the game includes a basic game and a bonus game, the basic game including a plurality of possible outcomes, the plurality of possible outcomes including a start-bonus outcome for triggering the bonus game, the adjustable parameter being a frequency of hitting the start-bonus outcome.

* * * * *